United States Patent [19]

Crummett

[11] 4,444,350
[45] Apr. 24, 1984

[54] METHOD OF MANUFACTURING BRAKE RODS

[75] Inventor: Donald L. Crummett, Joshua, Tex.

[73] Assignee: Halliburton Company, Duncan, Okla.

[21] Appl. No.: 494,678

[22] Filed: May 16, 1983

Related U.S. Application Data

[63] Continuation of Ser. No. 244,199, Mar. 16, 1981, abandoned.

[51] Int. Cl.³ .............................................. B23K 27/00
[52] U.S. Cl. ...................................... 228/112; 228/113
[58] Field of Search ......................................... 228/112

[56] References Cited

U.S. PATENT DOCUMENTS

| 3,234,642 | 2/1966 | Hollander | 228/114 |
| 3,735,910 | 5/1973 | Watson et al. | 228/113 X |
| 3,775,834 | 12/1973 | Ishikawa et al. | 228/112 |
| 3,840,979 | 10/1974 | Miller et al. | 228/112 |

FOREIGN PATENT DOCUMENTS 479594 11/1975 U.S.S.R. ............................... 228/112

*Primary Examiner*—Nicholas P. Godici
*Assistant Examiner*—M. Jordan
*Attorney, Agent, or Firm*—James R. Duzan; Thomas R. Weaver

[57] ABSTRACT

A method of making brake rods comprising the steps of welding brake rod jaws to the ends of a solid bar or annular member, securing one end of the brake rod against movement, heating the brake rod and aligning the brake rod jaws on the ends of the brake rod so that the lugs of the brake rod jaws are generally parallel to the lug of a jaw on the other end of the brake rod. Alternately, the brake rod may be heated then have one end secured against movement and the lugs of the brake rod jaws aligned.

4 Claims, 1 Drawing Figure

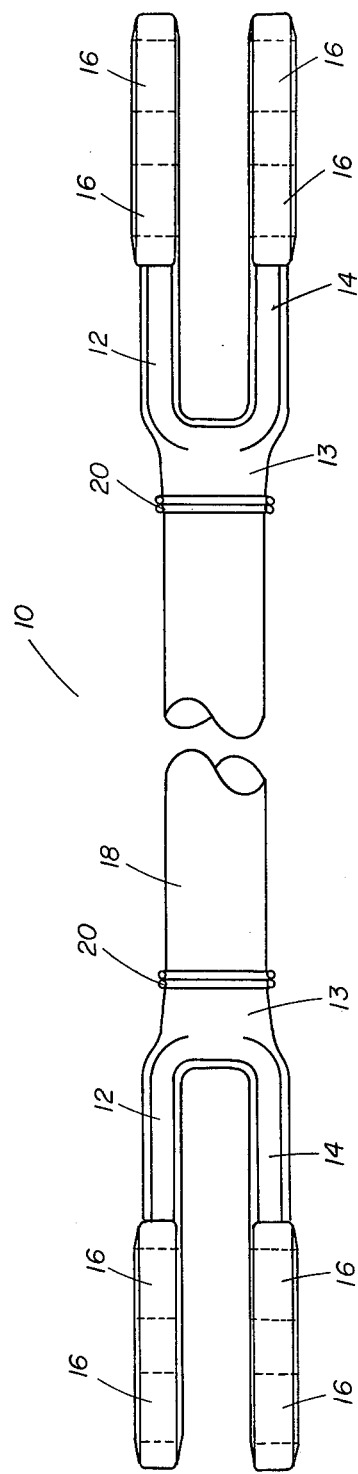

METHOD OF MANUFACTURING BRAKE RODS

This application is a continuation of application Ser. No. 244,199, filed Mar. 16, 1981, now abandoned.

BACKGROUND OF THE INVENTION

This invention relates to a method of making brake rods for railcars.

In railcars the connections between brake levers of the brake system are made by utilizing brake rods, sometimes referred to as bottom rods.

Common methods of making brake rods have included forging the brake rod in flat then forming the flat forging into the desired brake rod shape to form a brake rod having a hollow tube portion, arc welding brake rod jaws having a specially designed pocket on the ends of a solid bar to form the brake rod, resistance butt welding brake rod jaws to the ends of a solid bar to form the brake rod and heating and bending the end of a solid rod around the back portion of a specially designed brake rod jaw then cold forming the lugs on the jaw over the bent rod end to form a tight fit between the rod and jaw thereby forming the brake rod.

SUMMARY OF THE INVENTION

The present invention is directed to a method of making brake rods comprising the steps of welding brake rod jaws to the ends of a solid bar or annular member, securing one end of the brake rod against movement, heating the brake rod and aligning the brake rod jaws on the ends of the brake rod so that the lugs of the brake rod jaws are generally parallel to the lug of a jaw on the other end of the brake rod. Alternately, the brake rod may be heated then have one end secured against movement and the lugs of the brake rod jaws aligned.

BRIEF DESCRIPTION OF THE DRAWING

FIG. 1 is a top view of a brake rod made by the method of the present invention.

DESCRIPTION OF THE INVENTION

Referring to FIG. 1, a brake rod 10 manufactured by the present invention is shown.

The brake rod 10 comprises brake jaws 12 having a shank portion 13 having lugs 14 secured thereto, each lug 14 having, in turn, apertures 16 therethrough and a rod portion 18.

To manufacture the brake rod 10 the brake jaws 12 are initially formed by any convenient method having the appropriate holes 16 in the lugs 14 therein and the rod portion 18 is cut to the desired length. The brake jaws 12 are then inertia welded, also referred to as friction welding, to the rod portion 18. The rod portion 18 may either be a solid bar or annular member. The inertia welding of the brake jaws 12 to the rod portion 18 results in a high quality weld joint between the members, produces an amount of flash material 20 at the weld area, and usually results in the misalignment of a lug 14 of a brake jaw 12 with result to the corresponding lug 14 of the brake jaw 12 on the other end of the brake rod 10.

To align the lugs 14 of the brake jaws 12 so that the lugs 14 of a brake jaws 12 are generally parallel to the lugs 14 of the brake jaw 12 secured to the other end of the rod portion 18 the brake rod 10 is installed in either a fixture or vise to secure an end portion of the brake rod 10, the other end portion of the brake rod 10 is heated, and the other end portion is rotated until the lugs 14 of the brake jaw 12 are generally in alignment with the lugs 14 of the brake jaw 12 on the end portion of the brake rod 10 secured in a fixture or vise. It is usually considered satisfactory if the lugs 14 of the brake jaws 12 are aligned having horizontal planes passing through each lug 14 within three (3) degrees of alignment.

Once the lugs 14 of the brake jaws 12 are generally parallel to each other after securing the jaws 12 to the rod portion 18, the brake rod 10 is removed from the fixture or vise and the alignment of the lugs 14 is checked by inserting the brake rod 10 onto a fixture having pins which mate with holes 16 of the brake jaws 12 secured to rod portion 18. If the brake rod 10 cannot be placed onto the fixture such that the pins on the fixture engage a hole 16 in each lug 14 of a brake jaw 12 on each end of the brake rod 10, the lugs 14 are not sufficiently generally parallel with respect to each other and it is necessary to repeat the securing, heating and alignment steps described hereinbefore until the lugs 14 are acceptably aligned.

If desired, the brake rods 10 can be heated, then installed in a fixture or vise to secure an end portion of the brake rod 10 and subsequently the free end of the brake rod rotated until the lugs 14 of the brake jaws 12 are generally aligned with each other.

After the alignment of the lugs 14 of the brake jaws 12, the flash material 20 at the weld joint between the brake jaws 12 and rod portion 18 may be machined from the brake rod 10 to provide a generally smooth exterior surface on the brake rod 10.

If desired, the holes 16 in the lugs 14 of the brake jaws 12 may be heat treated to a desired degree of hardness before the inertia welding of the brake jaws 12 to the rod portion 18.

By inertia welding the brake jaws 12 to the rod portion 18 a large number of high quality weld joints may be accomplished in a relatively short period of time when compared to the arc welding or resistance butt welding of specially formed brake jaws 12 to a rod portion 18. Even though the inertia welding of the brake jaws 12 to the rod portion 18 requires the additional steps of heating and aligning the lugs 14 of the brake jaws 12 into a generally parallel relationship with respect to each other, the reduced amount of welding time and the resultant high quality weld obtained from an inertia or friction welding process allows the manufacture of the brake rod 10 in a comparable amount of time.

In comparision to forged brake rods a brake rod manufactured by the present invention offers greater flexibility in brake rod manufacture since it is easy to cut the rod portion to the desired length and inertia weld the brake jaws thereto than it is to design or modify forging dies for each differing length of brake rod or attempt to build a forged brake rod which may be used in situations where the length of the brake rod varies widely.

Having thus described my invention, I claim:

1. A method of making a brake rod for a railcar, said brake rod including brake jaws interconnected by a rod portion, said method comprising the steps of:
    selecting a rod means;
    cutting the rod means to a desired length thereby forming a rod portion;

selecting said brake jaws, each brake jaw including a shank having a plurality of lugs secured thereto, each lug having aperture means therein;

inertia welding shanks of said brake jaws to opposite ends of the rod portion thereby forming a brake rod having brake jaws interconnected by the rod portion;

removing said brake rod from the location where the inertia welding step occurred;

placing said brake rod into a fixture;

securing a brake jaw secured to one end of the rod portion from movement after placing said brake rod into the fixture;

heating at least a portion of the rod portion of the brake rod and brake jaws;

aligning the lugs of the brake jaw secured to one end of the rod portion into generally parallel relationship with respect to the lugs of the brake jaw secured to the other end of the rod portion by rotating a portion of the rod portion of the brake rod and brake jaws which have been heated in the heating step;

removing said brake rod from the fixture; and checking the alignment of the lugs of the brake jaw secured to one end of the rod portion with respect to the alignment of the lugs of the brake jaw secured to the other end of the rod portion by inserting said brake rod onto a fixture having pins which mate with the apertures in the lugs of the brake jaws to ensure that the lugs of the brake jaws are in a generally parallel relationship wherein a horizontal plane passing through each lug of one brake jaw of said brake rod is within substantially three degrees of alignment of a horizontal plane passing through each lug of another brake jaw of said brake rod.

2. The method of claim 1 wherein the rod means comprises a solid rod means.

3. The method of claim 1 wherein the rod means comprises an annular rod means.

4. A method of making a brake rod for a railcar, said brake rod including brake jaws interconnected by a rod portion, said method comprising the steps of:

selecting a rod means;

cutting the rod means to a desired length thereby forming a rod portion;

selecting said brake jaws, each brake jaw including a shank having a plurality of lugs secured thereto, each lug having aperture means therein;

welding the shanks of said brake jaws to ends of the rod portion thereby forming a brake rod having brake jaws interconnected by the rod portion;

removing said brake rod from the location where the step of welding occurred;

heating at least a portion of the rod portion of the brake rod and brake jaws;

securing the brake jaw secured to one end of the rod portion from movement by placing the rod portion in a fixture;

aligning the lugs of the brake jaw secured to one end of the rod portion into generally parallel relationship with respect to the lugs of the brake jaw secured to the other end of the rod portion by rotating a portion of the rod portion of the brake rod and brake jaws which have been heated in the heating step;

removing said brake rod from the fixture; and checking the alignment of the lugs of the brake jaw secured to one end of the rod portion with respect to the alignment of the lugs of the brake jaw secured to the other end of the rod portion by inserting said brake rod onto a fixture having pins which mate with the apertures in the lugs of the brake jaws to ensure that the lugs of the brake jaws are in a generally parallel relationship wherein a horizontal plane passing through each lug of one brake jaw of said brake rod is within substantially three degrees of alignment of a horizontal plane passing through each lug of another brake jaw of said brake rod.

* * * * *